(12) United States Patent
Jiang et al.

(10) Patent No.: US 12,343,679 B2
(45) Date of Patent: Jul. 1, 2025

(54) DOUBLE-LAYER SEALED BOX HAVING ACTIVATED CARBON CIRCULATION SEALING DEVICE

(71) Applicant: HUNAN UNIVERSITY, Changsha (CN)

(72) Inventors: Chao Jiang, Changsha (CN); Wanyi Tian, Changsha (CN); Huiqiu Deng, Changsha (CN); Xingke Gao, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 584 days.

(21) Appl. No.: 17/880,675

(22) Filed: Aug. 4, 2022

(65) Prior Publication Data

US 2023/0007833 A1     Jan. 12, 2023

Related U.S. Application Data

(63) Continuation of application No. PCT/CN2020/082474, filed on Mar. 31, 2020.

(30) Foreign Application Priority Data

Feb. 10, 2020    (CN) .......................... 202010084621.8

(51) Int. Cl.
| | |
|---|---|
| *B01D 53/83* | (2006.01) |
| *B01D 53/38* | (2006.01) |
| *B01D 53/46* | (2006.01) |
| *B01J 20/20* | (2006.01) |
| *B01J 20/28* | (2006.01) |
| *B65D 90/08* | (2006.01) |

(52) U.S. Cl.
CPC ............. *B01D 53/83* (2013.01); *B01D 53/38* (2013.01); *B01D 53/46* (2013.01); *B01J 20/20* (2013.01); *B01J 20/28052* (2013.01); *B65D 90/08* (2013.01); *B01D 2257/80* (2013.01)

(58) Field of Classification Search
CPC ........ B01D 53/83; B01D 53/38; B01D 53/46; B01D 2257/80; B01D 53/0407; B01D 2253/102; B01D 2257/104; B01D 2259/4525; B01J 20/20; B01J 20/28052; B65D 90/08; Y02W 30/80; B65G 17/126; B65G 33/14; C01B 32/354; G01N 33/00
See application file for complete search history.

(56) References Cited

FOREIGN PATENT DOCUMENTS

CN     209853735 U   * 12/2019

OTHER PUBLICATIONS

CN-209853735-U machine translation (Year: 2019).*

* cited by examiner

*Primary Examiner* — Kevin Joyner
*Assistant Examiner* — Jacob Paul Strayer

(57) ABSTRACT

The invention discloses a double-layer sealed box having an activated carbon circulation sealing device, comprising an outer layer box, an inner layer box, and an activated carbon input device. The inner layer box is wrapped in the outer layer box, a first activated carbon transport chamber is formed at the top of the inner layer box, between the outer layer box and the inner layer box, and a second activated carbon transport chamber is formed at least one side of the inner layer box, between the outer layer box and the inner layer box.

8 Claims, 4 Drawing Sheets

DOUBLE-LAYER SEALED BOX HAVING ACTIVATED CARBON CIRCULATION SEALING DEVICE

RELATED APPLICATION

The present application claims the priority of China Invention Patent application No. 201811518260.2, titled "Double-layer Sealed Box Having Activated Carbon Circulation Sealing Device" filed on Feb. 10, 2020.

FIELD OF THE INVENTION

The invention relates to the field of sealing technology, and specifically to a double-layer sealed box having an activated carbon circulation sealing device.

BACKGROUND

As sealed boxes are used more and more widely, the requirements for the sealing performance and functional diversity of sealed boxes are becoming more and more stringent. Especially in the application fields such as thermal insulation boxes, safes, and special boxes, double-layer sealing structure boxes are proposed to achieve better sealing performance.

In existing double-layer sealed structure box, an inert gas (such as argon) is usually continuously introduced into a double-layer jacket of the sealed box to meet strict sealing requirements. However, argon and other inert gases are expensive and cannot be recycled. As a result, the cost is high, and it is difficult to both ensure strict sealing requirements and to control costs to achieve good economy. As the double-layer sealed box is used to strictly control the concentrations of water and oxygen inside the box, a substance that can react with water and an oxidizing gas and has a lower price may be found to replace argon to meet both the sealing performance and economy.

SUMMARY

In view of the foregoing problem that it is difficult to achieve both the sealing performance and the economic cost in introducing argon and other inert gases into a jacket of a double-layer sealed box, the present invention provides a double-layer sealed box having an activated carbon circulation sealing device to both meet strict sealing requirements and achieve good economy.

Specifically, the present application provides a double-layer sealed box having an activated carbon circulation sealing device, wherein it comprises an outer layer box, an inner layer box, an activated carbon input device, a top activated carbon recovery device, a sampling detection device, and an underground activated carbon recovery device.

The inner layer box is wrapped in the outer layer box, a first activated carbon transport chamber is formed at the top of the the inner layer box, between the outer layer box and the inner layer box, and a second activated carbon transport chamber is formed on at least one side (preferably, four sides, that is, around the inner layer box) of the the inner layer box, between the outer layer box and the inner layer box.

The activated carbon input device is connected with the first activated carbon transport chamber through a first opening on the top surface of the outer box, and the activated carbon input device is connected with the second activated carbon transport chamber through a second opening arranged on the surface of the outer box.

The sampling detection device is connected with the second activated carbon transport chamber through a third opening in the middle of the surface of the outer box.

The top activated carbon recovery device is connected with the first activated carbon transport chamber through a fourth opening on the front surface of the outer box.

The underground activated carbon recovery device is connected with the second activated carbon transport chamber at the lower surface of the outer box.

Preferably, the activated carbon input device comprises a feed inlet, a heat pipe, a reduction box, rotary valves, top delivery pipes, several lateral delivery pipes, several shaftless screw conveyors, several top separating plates, a first stop valve, a second stop valve, and several third stop valves.

The feed inlet, the heat pipe, and the reduction box are connected in sequence, a bottom of the reduction box is connected to each of the top delivery pipes and the lateral delivery pipes, wherein the first stop valve is arranged between the feed inlet and the heat pipe, the second stop valve is arranged between the heat pipe and the reduction box, each of the third stop valves is arranged in one of the top delivery pipe, each of the rotary valve is arranged in one of the lateral delivery pipes.

Preferably, the top activated carbon recovery device comprises several top recovery boxes, several top feed pipes, one or more bucket elevators, several fourth stop valves, and several fifth stop valves.

Each of the top recovery box is connected with one top feed pipe, all of the top feed pipe are connected with the bucket elevators, the fourth stop valve and the fifth stop valve respectively arranged in the top recovery box and the top feed pipe, the top recovery box is connected with the first activated carbon transport chamber, and a output of the bucket elevator is aligned with the feed inlet.

Preferably, the sampling detection device comprises a sixth stop valve and a detection box, the sixth stop valve is used to control opening and closing of the detection box, and the detection box is connected with the second activated carbon transport chamber.

Preferably, the underground activated carbon recovery device is connected to the second activated carbon transport chamber at the bottom of the second activated carbon transport chamber, the underground activated carbon recovery device is used to receive the activated carbon already used, reduct the activated carbon received, and deliver the activated carbon reduced to the feed inlet.

Preferably, the outer layer box is formed by jointing a bottom plate and a plurality of outer plates together, the outer plates comprise a front outer plate, a top outer plate, a left outer plate, a right outer plate and a back outer plate, and the plurality of outer plates are welded to the bottom plate in sequence to form the outer layer box.

Preferably, the inner layer box is wrapped in the outer layer box, and the inner layer box comprises a plurality of inner plates which comprise a front inner plate, a top inner plate, a left inner plate, a right inner plate, and a back inner plate, four sides of the top inner plate are respectively welded to inner surfaces of the front outer plate, the left outer plate, the right outer plate, and the back outer plate, left side and right side of the front inner plate are respectively welded to the inner surfaces of the left outer plate and the right outer plate, left and right sides of the front inner plate and the back inner plate are respectively welded to the inner surfaces of the left outer plate and the right outer plate and the plurality of inner plates are welded to the bottom plate in sequence to form the inner layer box.

Preferably, the first activated carbon transport chamber is separated into several sub-chambers by several top separating plates, each sub-chamber is installed with one shaftless screw conveyor, and the second activated carbon transport chamber is separated into several sub-chambers by several side separating plates.

The beneficial effects include:

In the double-layer sealed box having an activated carbon circulation sealing device disclosed in the invention, a double-layer box structure is used to form jackets/champers between the inner layer box and the outer layer box. A top champer and a lateral champer are divided by partitions into equal volumes. The whole jacket is filled with activated carbon by means of a shaftless screw conveyor and the gravity action of activated carbon. Treated activated carbon has the ability of reacting with moisture and an oxidizing gas due to the action of a heat pipe and a reduction box, thereby effectively reducing the concentrations of water and oxygen in the champer, enhancing the sealing performance, and implementing the recycling of activated carbon by means of recovery devices. In addition, the price of activated carbon is relatively low, thereby greatly reducing the high cost caused by continuously introducing an inert gas such as argon, satisfying the strict requirements of ensuring the sealing and controlling the cost, and achieving good economy.

DETAILED DESCRIPTION OF EMBODIMENTS

The invention is further described below in detail with reference to the embodiments of the accompanying drawings. However, the embodiments of the invention are not limited thereto.

Figure 1:
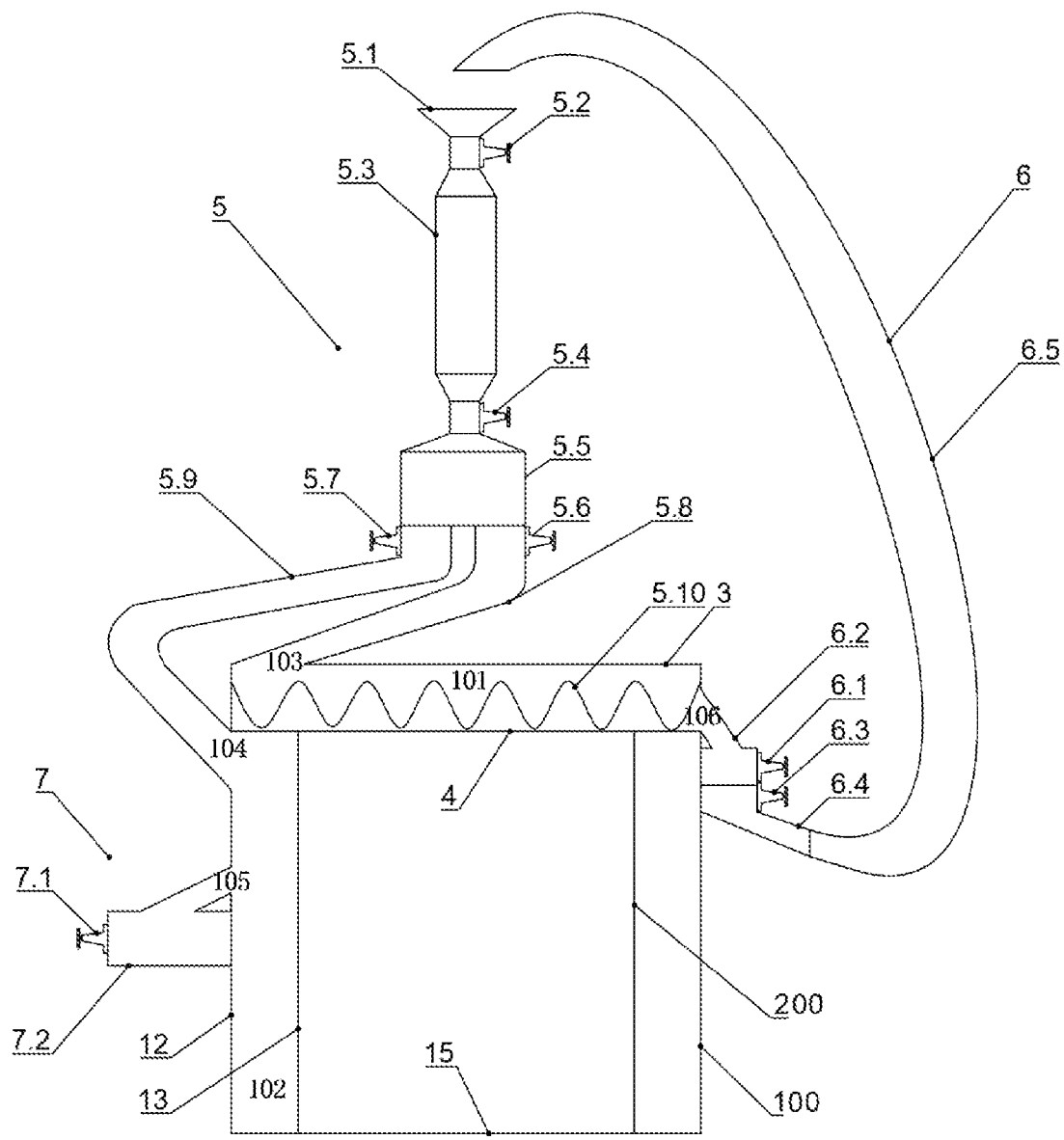
FIG. 1 is an overall schematic structural diagram according to a specific embodiment of the invention (an underground activated carbon recovery device is not comprised)
Figure 2:
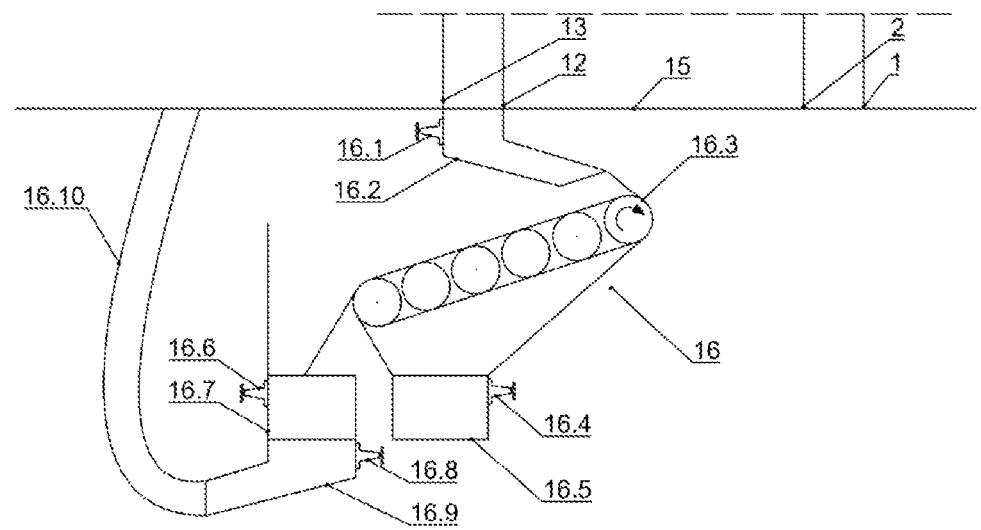
FIG. 2 is a schematic diagram of an underground activated carbon recovery device according to a specific embodiment of the invention.
Figure 4:
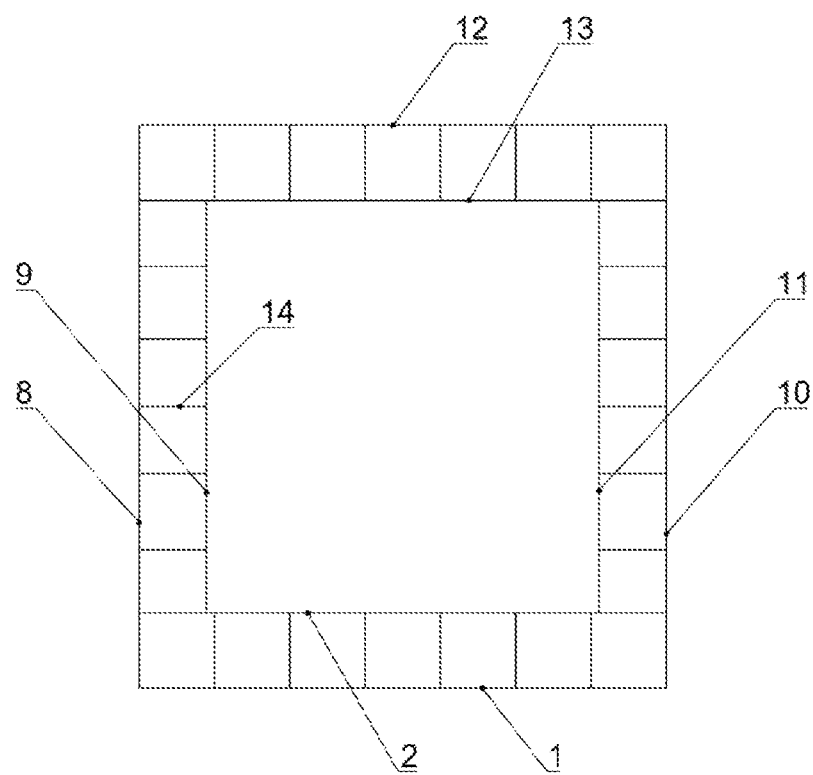
FIG. 4 is a schematic top view of a lateral jacket according to a specific embodiment of the invention.

As shown in FIG. 1, FIG. 2, and FIG. 4, this embodiment provides a double-layer sealed box having an activated carbon circulation sealing device. The double-layer sealed box comprises an outer layer box, an inner layer box, an activated carbon input device 5), a top activated carbon recovery device 6, a sampling detection device 7, and an underground activated carbon recovery device 16. The inner layer box 200 is wrapped in the outer layer box 100, a first activated carbon transport chamber 101 is formed at the top of the inner layer box 200, between the outer layer box 100 and the inner layer box 200, and a second activated carbon transport chamber 102 is formed at least one side of the inner layer box 200, between the outer layer box 100 and the inner layer box 200.

Figure 3:
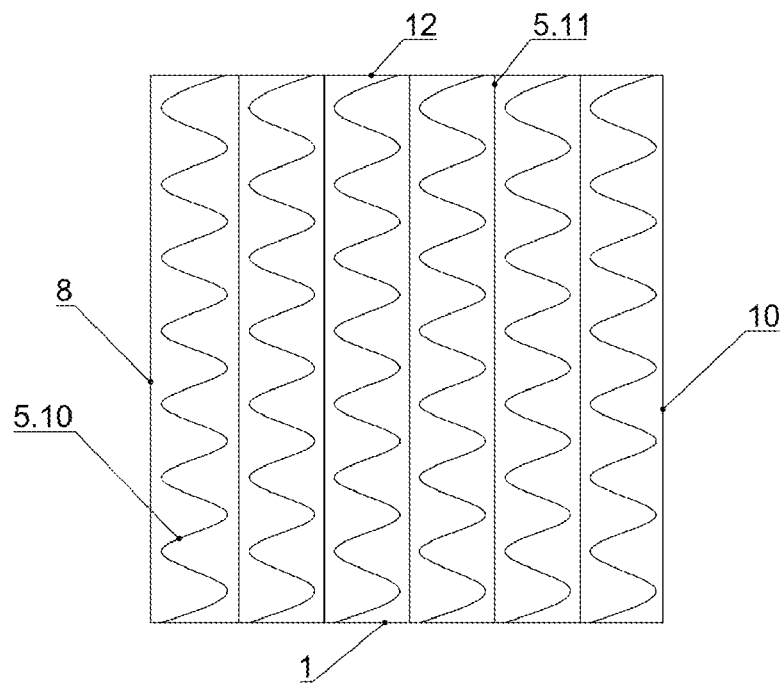
FIG. 3 is a schematic top view of a top chamber (the first chamber) according to a specific embodiment of the invention.

The activated carbon input device 5 is connected with the first activated carbon transport chamber 101 through a first opening 103 on the top surface of the outer box 100, and the activated carbon input device 5 is connected with the second activated carbon transport chamber 102 through a second opening 104 arranged on the rear surface of the outer box 100. As shown in FIG. 3, the first activated carbon transport chamber is separated into several sub-chambers by several top separating plates 5.11, each sub-chamber is installed with one shaftless screw conveyor 5.10. As shown in FIG. 4, the second activated carbon transport chamber 102 is separated into several sub-chambers by several side separating plates 14.

The sampling detection device 7 is connected with the second activated carbon transport chamber 102 through a third opening 105 in the middle of the rear surface of the outer box 100.

The top activated carbon recovery device 6 is connected with the first activated carbon transport chamber 101 through a fourth opening 106 on the front surface of the outer box 100.

The underground activated carbon recovery device 16 is connected with the second activated carbon transport chamber 102 at the lower surface of the outer box 100.

The outer layer box is formed by splicing a bottom plate 15 and a plurality of outer plates. The plurality of outer plates comprise a front outer plate 1, a top outer plate 3, a left outer plate 8, a right outer plate 10, and a back outer plate 12. The plurality of outer plates are welded to the bottom plate 15 in sequence to form the outer layer box.

The inner layer box is wrapped in the outer layer box. The inner layer box is formed by splicing a bottom plate 15 and a plurality of inner plates. The plurality of inner plates of the inner layer box comprise a front inner plate 2, a top inner plate 4, a left inner plate 9, a right inner plate 11, and a back inner plate 13. Four sides of the top inner plate 4 are respectively welded to inner surfaces of the front outer plate 1, the left outer plate 8, the right outer plate 10, and the back outer plate 12. Left and right sides of the front inner plate 2 and the back inner plate 13 are respectively welded to the inner surfaces of the left outer plate 8 and the right outer plate 10. The plurality of inner plates are welded to the bottom plate 15 in sequence to form the inner layer box. The activated carbon input device 5 is connected and passing through the top outer plate 3 and the back outer plate 12. The sampling detection device 7 is connected and passing through the back outer plate 12. The top activated carbon recovery device 6 is connected and passing through the front outer plate 1. The underground activated carbon recovery device 16 is connected and passing through the bottom plate 15. These together form the double-layer sealed box having an activated carbon circulation sealing device.

As shown in FIG. 1, FIG. 3, and FIG. 4, the activated carbon input device 5 comprises a feed inlet 5.1, a heat pipe 5.3, a reduction box 5.5, several rotary valves 5.7, several top delivery pipes 5.8, several lateral delivery pipes 5.9, several shaftless screw conveyors 5.10, several top partition 5.11, a first stop valve 5.2, a second stop valve 5.4, and several third stop valves 5.6. The feed inlet 5.1, the heat pipe 5.3, and the reduction box 5.5 are connected in sequence. Each of the top delivery pipes 5.8 and the lateral delivery pipes 5.9 is connected to bottom of the reduction box 5.5. The first stop valve 5.2, the second stop valve 5.4, and the third stop valves 5.6 respectively control opening and closing of the heat pipe 5.3, the reduction box 5.5, and the top delivery pipes 5.8. The rotary valves 5.7 control delivery rates of the lateral delivery pipes 5.9. The top delivery pipes

5.8 and the lateral delivery pipes 5.9 respectively pass through the top outer plate 3 and a lateral outer plate to be in communication with the top activated carbon transport chamber/jacket and the lateral activated carbon transport chamber/jacket. Preferably, there are four set of the rotary valves 5.7, several lateral delivery pipes 5.9, each set is connected with one side of the outer layer box.

As shown in FIG. 3, the top separating plates 5.11 divides the top activated carbon transport chamber into sub-chambers with equal volumes. Each sub-chamber is installed with one shaftless screw conveyor 5.10.

Figure 5:
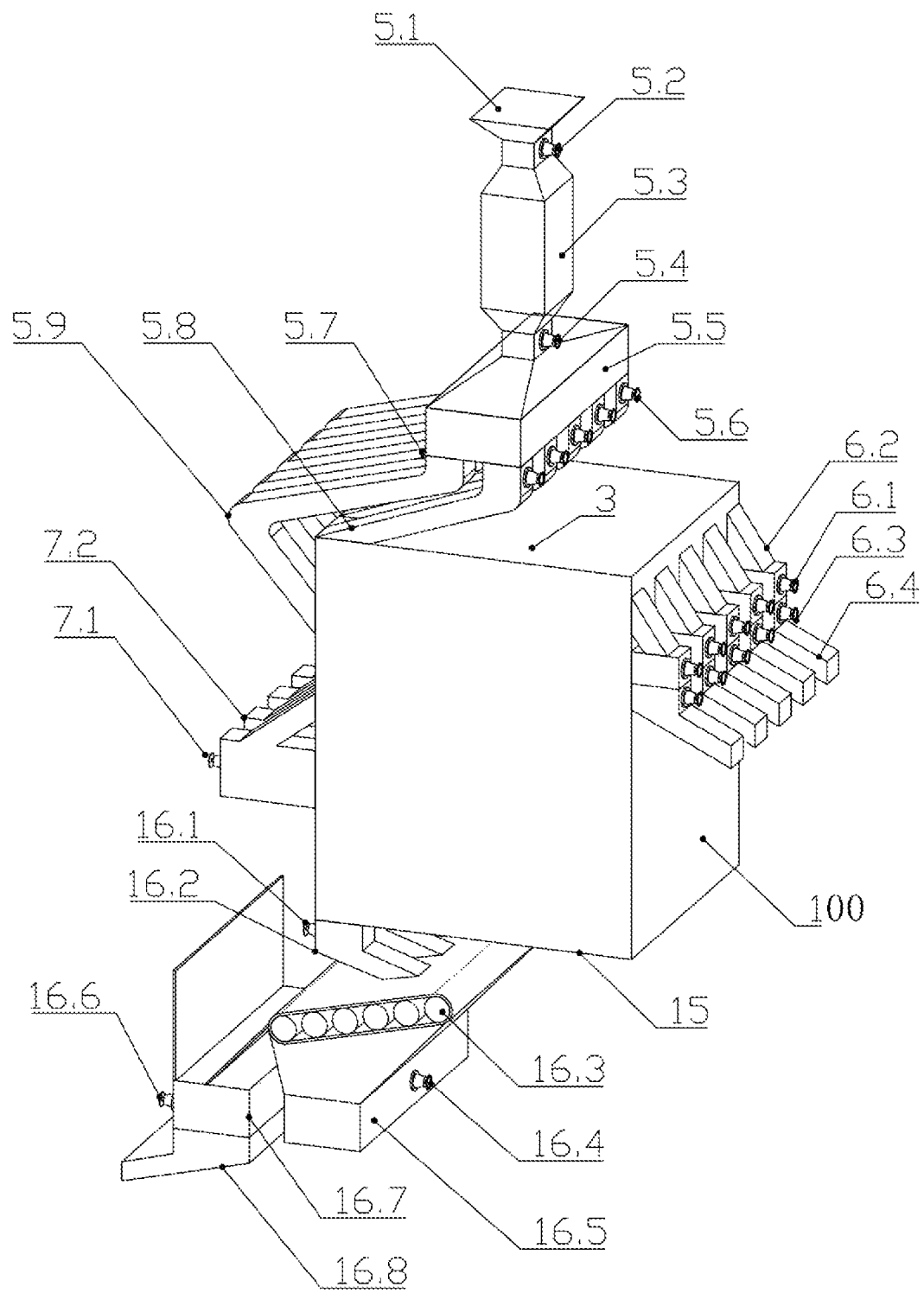
FIG. 5 is a three-dimensional structural diagram of the double-layer sealing box according to an embodiment of the present invention.

As shown in FIGS. 1 and 5, the top activated carbon recovery device 6 comprises several top recovery boxes 6.2, several top feed pipes 6.4, one or more bucket elevators 6.5, several fourth stop valves 6.1, and several fifth stop valves 6.3.

Delivery ports of the top recovery boxes 6.2, the top feed pipes 6.4, and the bucket elevators 6.5 are connected in sequence. Each of the top recovery box 6.2 is connected with one top feed pipe 6.4, and all of the top feed pipe 6.4 are connected with one or more bucket elevators (6.5). The fourth stop valves 6.1 and the fifth stop valves 6.3 respectively control opening and closing of corresponding top recovery boxes 6.2 and the top feed pipes 6.4. Each of the top recovery boxes 6.2 passes through the front outer plate 1 to be in communication with one top sub-chamber. Output of the bucket elevator 6.5 is aligned with the feed inlet 5.1.

As shown in FIG. 1 and FIG. 5, the sampling detection device 7 comprises several sixth stop valves 7.1 and several detection boxes 7.2. Each of the sixth stop valve 7.1 controls opening and closing of one corresponding detection box 7.2. Several lateral separating plates 14 divide the lateral activated carbon transport chamber into several sub-chambers with equal volumes. Each detection box 7.2 passes through the lateral outer plate to be in communication with one sub-chamber.

As shown in FIG. 2, the underground activated carbon recovery device 16 comprises several underground rewinding pipes 16.2, a roller screen 16.3, a scrap box 16.5, an underground recovery box 16.7, an underground feed pipe 16.9, a bucket elevator 16.10, several seventh stop valves 16.1, an eighth stop valve 16.4, a ninth stop valve 16.6, and a tenth stop valve 16.8.

The seventh stop valves 16.1, the eighth stop valve 16.4, the ninth stop valve 16.6, and the tenth stop valve 16.8 respectively control opening and closing of the underground rewinding pipe 16.2, the scrap box 16.5, the underground recovery box 16.7, and the underground feed pipe 16.9. Each of the underground rewinding pipe 16.2 passes through the bottom plate 15 to be in communication with one sub-chamber of the lateral activated carbon transport chamber. An outlet of the underground rewinding pipe 16.2 is aligned with a feeding end of the roller screen 16.3. Bottom of the roller screen 16.3 is connected to the scrap box 16.5. Output of the roller screen 16.3 is aligned with an inlet of the underground recovery box 16.7. Delivery ports of the underground recovery box 16.7, the underground feed pipe 16.9, and the bucket elevator 16.10 are connected in sequence. Output of the bucket elevator 16.10 is aligned with a feed inlet 5.1.

As shown in FIG. 1, FIG. 2, and FIG. 5, in the activated carbon input device 5, activated carbon is first poured in the feed inlet 5.1. The first stop valve 5.2 is then opened to allow the activated carbon to enter the heat pipe 5.3. The first stop valve 5.2 is closed. The heat pipe 5.3 is heated to a high temperature of approximately 800 degrees to resolve the activated carbon to make the activated carbon purer. The second stop valve 5.4 is opened to allow the resolved activated carbon to enter the reduction box 5.5. The second stop valve 5.4 is closed. The activated carbon is treated with a strong reducing agent in the reduction box 5.5, to enable the activated carbon to undergo a reduction reaction with an oxidizing gas. The third stop valves 5.6 are then opened and the rotary valves 5.7 are controlled to allow the treated activated carbon to be delivered into the top activated carbon transport chamber 101 and the lateral activated carbon transport chamber 102 through the top delivery pipes 5.8 and the lateral delivery pipes 5.9. The whole chambers of the double-layer sealed box is filled with activated carbon by means of a shaftless screw conveyor 5.10 and the gravity action of activated carbon.

In the top activated carbon recovery device 6, the fourth stop valves 6.1 are opened to allow reacted activated carbon in the top jacket to be recovered into the top recovery boxes 6.2. Then the fourth stop valves 6.1 are closed. The fifth stop valves 6.3 are opened. The top feed pipes 6.4 deliver the recovered activated carbon to the feed inlet 5.1 again through the bucket elevator 6.5. An initial process that activated carbon undergoes after entering the feed inlet 5.1 is repeated to implement recycling of the reacted activated carbon in the top jacket.

In the sampling detection device 7, the sixth stop valves 7.1 are opened to allow a small amount of activated carbon to enter the detection boxes 7.2. A reaction degree of the activated carbon, moisture, and an oxidizing gas is detected and fed back to the rotary valves 5.7 in the activated carbon input device 5 to implement control of a delivery rate of the lateral delivery pipes 5.8.

In the top activated carbon recovery device 16, the seventh stop valves 16.1 are opened to allow completely reacted activated carbon in the lateral jacket to be delivered to the roller screen 16.3 through the underground rewinding pipe 16.2. Then, the seventh stop valves 16.1 are closed. Then, the eighth stop valve 16.4 is opened. Some fragments of the activated carbon are collected in the scrap box 16.5 under the action of the roller screen 16.3. Relatively complete activated carbon is recovered in the underground recovery box 16.7. The tenth stop valve 16.8 is opened. The underground feed pipe 16.9 delivers the recovered activated carbon to the feed inlet 5.1 again through the bucket elevator 16.10. The principle is the same as that of the top activated carbon recovery device 6 to implement recycling of the reacted activated carbon in the lateral jacket.

In the double-layer sealed box having an activated carbon circulation sealing device above, a double-layer box structure is used to form a chamber/jacket between the inner layer box and the outer layer box. Treated activated carbon has the ability of reacting with moisture and an oxidizing gas due to the action of a heat pipe and a reduction box, so that the concentrations of water and oxygen in the jacket of the box can be strictly controlled, thereby meeting a strict sealing requirement, and implementing the recycling of activated carbon by means of a recovery device, and the cost of activated carbon is relatively low, thereby satisfying the sealing performance and achieving good economy.

It should be noted that the foregoing descriptions are merely preferred embodiments of the invention and are not used to limit the invention. Within the spirit and principles of the invention, any modifications, equivalent substitutions, improvements, and the like are within the protection scope of the invention.

The invention claimed is:

1. A double-layer sealed box having an activated carbon circulation sealing device, wherein it comprises an outer layer box, an inner layer box, an activated carbon input device, a top activated carbon recovery device, a sampling detection device, and an underground activated carbon recovery device, wherein the inner layer box is wrapped in the outer layer box, a first activated carbon transport chamber is formed at the top of the inner layer box, between the outer layer box and the inner layer box, and a second activated carbon transport chamber is formed around the inner layer box, between the outer layer box and the inner layer box, the activated carbon input device is connected with the first activated carbon transport chamber through at least one first opening on the top surface of the outer box, and the activated carbon input device is connected with the second activated carbon transport chamber through at least one second opening arranged on the surface of the outer box;

the sampling detection device is connected with the second activated carbon transport chamber through at least one third opening in the middle of the surface of the outer box;

the top activated carbon recovery device is connected with the first activated carbon transport chamber through at least one fourth opening on the front surface of the outer box;

the underground activated carbon recovery device is connected with the second activated carbon transport chamber at the lower surface of the outer box.

2. The double-layer sealed box having an activated carbon circulation sealing device according to claim 1, wherein the activated carbon input device comprises a feed inlet, a heat pipe, a reduction box, a plurality of rotary valves, a plurality of top delivery pipes, a plurality of lateral delivery pipes, a plurality of shaftless screw conveyors, a plurality of top separating plates, a first stop valve, a second stop valve, and a plurality of third stop valves, wherein the feed inlet, the heat pipe, and the reduction box are connected in sequence, a bottom of the reduction box is connected to each of the top delivery pipes and the lateral delivery pipes, wherein the first stop valve is arranged between the feed inlet and the heat pipe, the second stop valve is arranged between the heat pipe and the reduction box, each of the third stop valves is arranged in one of the top delivery pipe, each of the rotary valve is arranged in one of the lateral delivery pipes.

3. The double-layer sealed box having an activated carbon circulation sealing device according to claim 2, wherein the top activated carbon recovery device comprises a plurality of top recovery boxes, a plurality of top feed pipes, one or more bucket elevators, a plurality of fourth stop valves, and a plurality of fifth stop valves, wherein each of the top recovery box is connected with one top feed pipe, all of the top feed pipe are connected with the bucket elevators, the fourth stop valve and the fifth stop valve respectively arranged in the top recovery box and the top feed pipe, the top recovery box is connected with the first activated carbon transport chamber, and a output of the bucket elevator is aligned with the feed inlet.

4. The double-layer sealed box having an activated carbon circulation sealing device according to claim 1, wherein the sampling detection device comprises a sixth stop valve and a detection box, the sixth stop valve is used to control opening and closing of the detection box, and the detection box is connected with the second activated carbon transport chamber.

5. The double-layer sealed box having an activated carbon circulation sealing device according to claim 2, wherein the underground activated carbon recovery device is connected to the second activated carbon transport chamber at the bottom of the second activated carbon transport chamber, the underground activated carbon recovery device is used to receive the activated carbon already used, reduct the activated carbon received, and deliver the activated carbon reducted to the feed inlet.

6. The double-layer sealed box having an activated carbon circulation sealing device according to claim 1, wherein the outer layer box is formed by jointing a bottom plate and a plurality of outer plates together, the outer plates comprise a front outer plate, a top outer plate, a left outer plate, a right outer plate and a back outer plate, and the plurality of outer plates are welded to the bottom plate in sequence to form the outer layer box.

7. The double-layer sealed box having an activated carbon circulation sealing device according to claim 6, the inner layer box is wrapped in the outer layer box, and the inner layer box comprises a plurality of inner plates which comprise a front inner plate, a top inner plate, a left inner plate, a right inner plate, and a back inner plate, four sides of the top inner plate are respectively welded to inner surfaces of the front outer plate, the left outer plate, the right outer plate, and the back outer plate, left side and right side of the front inner plate are respectively welded to the inner surfaces of the left outer plate and the right outer plate, left and right sides of the front inner plate and the back inner plate are respectively welded to the inner surfaces of the left outer plate and the right outer plate and the plurality of inner plates are welded to the bottom plate in sequence to form the inner layer box.

8. The double-layer sealed box having an activated carbon circulation sealing device according to claim 2, wherein the first activated carbon transport chamber is separated into a plurality of sub-chambers by a plurality of top separating plates, each sub-chamber is installed with one shaftless screw conveyor, and the second activated carbon transport chamber is separated into a plurality of sub-chambers by a plurality of side separating plates.

* * * * *